United States Patent [19]

Imura

[11] 4,014,034
[45] Mar. 22, 1977

[54] SINGLE LENS REFLEX CAMERA

[75] Inventor: Toshinori Imura, Sakai, Japan

[73] Assignee: Minolta Camera Kabushiki Kaisha, Japan

[22] Filed: Apr. 21, 1975

[21] Appl. No.: 569,753

[30] Foreign Application Priority Data

Apr. 25, 1974  Japan .................. 49-46013[U]
Apr. 25, 1974  Japan .................. 49-46511[U]
Apr. 25, 1974  Japan .................. 49-46512[U]

[52] U.S. Cl. .................. 354/152; 354/272
[51] Int. Cl.² .................. G03B 19/12; G03B 9/02
[58] Field of Search .......... 354/152, 153, 154, 155, 354/156, 270, 272

[56] References Cited

UNITED STATES PATENTS

| | | | |
|---|---|---|---|
| 3,468,232 | 9/1969 | Knapp | 354/156 |
| 3,731,609 | 5/1973 | Kobayashi et al. | 354/152 |
| 3,854,811 | 12/1974 | Araki | 354/153 |
| 3,887,932 | 6/1975 | Uno et al. | 354/156 |
| 3,891,992 | 6/1975 | Ueda et al. | 354/152 |

*Primary Examiner*—Edna M. O'Connor
*Attorney, Agent, or Firm*—Watson, Cole, Grindle & Watson

[57] ABSTRACT

A single lens reflex camera in which the drive force for returning a diaphragm to its open aperture position upon termination of an exposure operation is isolated from the force causing the return of a reflecting mirror from its picture taking position to its viewing position. The camera has a diaphragm which is normally biased in a direction for being stopped-down to a pre-adjusted diaphragm aperture. A spring mechanism when coupled to the diaphragm biases it in its open position against its normal tendency. A diaphragm drive mechanism enables the diaphragm, however, to be stopped down from its open position to its pre-adjusted diaphragm aperture upon actuation of an exposure operation. Upon completion of the exposure operation, the diaphragm drive member is disengaged from the diaphragm thereby enabling the diaphragm to return to its open aperture position under the influence of the spring mechanism. The reflecting mirror is movable from its viewing position to its picture taking position in association with the operation of the diaphragm drive mechanism and subsequently returns to its picture taking position upon termination of the exposure operation.

23 Claims, 7 Drawing Figures

SINGLE LENS REFLEX CAMERA

BACKGROUND OF THE INVENTION

The present invention relates to a single reflex camera and more particularly to a drive mechanism of a single reflex camera which enables a photographic object to be viewed in a bright condition immediately before and after exposure.

These drive mechanisms control the operation of a movable reflecting mirror and a diaphragm of an objective lens. In previously known arrangements of such drive mechanisms, the movable reflecting mirror has a normal tendency to be moved to its viewing position, while the diaphragm for the objective lens, which has a normal tendency to be stopped down, is maintained in its open position against its normal tendency. Immediately before an exposure operation, the reflecting mirror is moved from its viewing position to its picture taking position in association with initiation of the releasing operation of a shutter. The diaphragm is then stopped down from its open position to its pre-adjusted diaphragm aperture, after which the shutter is released to commence with exposure. After completion of the exposure operation in association with completion of the travel of a rear curtain, the movable reflecting mirror is returned to its viewing position to again enable viewing of an object in a bright condition. The diaphragm is then returned from its pre-adjusted position to its open position.

The prior art drive mechanism of the type described, however, drives the movable reflecting mirror and a diaphragm only by means of a single drive mechanism. As a result, in the return travel after the exposure operation, when the diaphragm is driven to its open position by the spring member, the returning or restoring force of the spring member is added through the drive mechanism to the force of the movable reflecting mirror returning to its viewing position. For this reason, when the movable reflecting mirror stops in its predetermined viewing position, there is still exerted a large moment inertia on the mirror, which causes difficulties in stopping the mirror in its predetermined position in a stable manner.

SUMMARY OF THE INVENTION

An object of the present invention is to overcome the shortcomings experienced with prior art single reflex cameras as described above.

Another object of the present invention is to provide a single lens reflex camera in which the force for returning the movable reflecting mirror to its viewing position upon completion of an exposure operation is isolated from the driving force returning the diaphragm to its open position.

A further object of the present invention is to provide a single lens reflex camera of the type, in which: the diaphragm has a normal tendency to be stopped down and is adapted to be maintained in its open position under the influence of a spring member biased against the normal tendency; upon of a shutter releasing operation but prior to the actual exposure, i.e., completion of the exposure operation, a diaphragm drive mechanism enables the diaphragm to be stopped down from its open position to its pre-adjusted diaphragm aperture; upon completion of exposure, the driving motion to stop down the diaphragm drive mechanism is interrupted, so that the diaphragm is opened by the spring member; and within such a single reflex camera the driving motion of the spring member for opening the diaphragm is prevented from being exerted on the movable reflecting mirror as it moves from its picture taking position to its viewing position.

It is still another object of the present invention to provide a single lens reflex camera, in which the movement of a drive member from its rest position to its cocked position for driving the diaphragm drive mechanism and the reflecting mirror drive mechanism is rendered smooth, thereby presenting a lighter releasing operation.

These objectives are accomplished in accordance with the single lens reflex camera of the present invention. The diaphragm of the camera is normally biased in a direction for being stopped down from its open position to a pre-adjusted diaphragm aperture. A spring mechanism is operatively coupled with the diaphragm for biasing it against its normal tendency into its open position. A diaphragm drive member enables the diaphragm to be stopped down from its open position to its pre-adjusted diaphragm aperture upon the occurrence of a shutter releasing operation but prior to the actual exposure. Upon completion of the exposure operation, the diaphragm drive mechanism is disengaged from the diaphragm thereby causing the diaphragm to be returned to its open aperture position due to the influence of the spring mechanism. The camera also includes a reflecting mirror which is movable between a viewing position and a picture taking position in association with operation of the diaphragm drive mechanism. The reflecting mirror then returns to its viewing position upon termination of the exposure operation. The driving force of the spring mechanism is isolated from the reflecting mirror during its return movement from its picture taking position to its viewing position.

The single lens reflex camera according to the present invention includes an actuating member which is reciprocally driven by a drive member via a drive-force transmitting member, is association with the releasing operation of a shutter. The diaphragm of the camera has a normal tendency to be stopped down but is maintained in its open position against this tendency by means of a spring member. The diaphragm is permitted to be stopped down from its open position to a pre-adjusted diaphragm aperture by means of a diaphragm drive mechanism which is coupled with the actuating member. A movable reflecting mirror of the camera is shifted from its viewing position to its picture taking position by means of a reflecting mirror drive member, which is connected with the actuating member by a pin and slot arrangement. Upon completion of the exposure operation, the drive member is disengaged from the drive-force transmitting member, so that the actuating member which is biased returns to its original position by means of the spring member brings the diaphragm from its stopped-down position to its open position. During this movement, however, the actuating member is disengaged from the reflecting mirror drive member, so that the movable reflecting mirror returns to its viewing position due to its own tendency to be biased in that position.

The diaphragm drive mechanism includes a diaphragm intermediate lever which rotates about a first shaft in association with the actuating member and a diaphragm drive member which is journaled on a shaft positioned separately of the first shaft. The diaphragm intermediate lever is connected via a lever to the diaphragm drive member, so that the output force of the diaphragm drive mechanism is increased from its input force to stop down the diaphragm, when the diaphragm is in its open condition.

The single lens reflex camera can also include a manually movable diaphragm member which manually stops down the diaphragm to a pre-adjusted diaphragm aperture prior to the commencement of an exposure operation so as to enable viewing of the focal depth at that time. The resulting impact caused by the excessive force of an automatic stopping down mechanism, however, may be prevented.

Various features of the single lens reflex camera of the present invention are summarized below. The drive member is mounted in the camera so as to be reciprocable between its cocked position and its rest position in association with the releasing operation of the shutter. The drive-force transmitting member is arranged in engagement with the drive member. The actuating member is reciprocably mounted. The diaphragm of the objective lens has a tendency to be stopped down. The spring member maintains the diaphragm in its open position against its normal tendency. The diaphragm drive member in association with the advancing movement of the actuating member stops down the diaphragm from its open position to its pre-adjusted diaphragm aperture. The reflecting mirror drive member is interlocked with the actuating member through a pin-slot mechanism. The reflecting mirror is normally urged into its viewing position. In association with the advancing movement of the actuating member, the diaphragm drive member is driven and the reflecting mirror drive member is caused to shift the movable reflecting mirror from its viewing position to its picture taking position against its normal tendency, after which the exposure operation is effected by releasing the shutter. Subsequently, in association with completion of the exposure operation, the drive member is disengaged from the drive-force transmitting member so that the diaphragm, which was in its stopped-down position, is returned to its open position due to the returning movement of the actuating member and the urging of the spring member. The reflecting mirror is also returned from its picture taking position to its viewing position.

More particularly, the actuating member may cause both the diaphragm drive member and the reflecting mirror drive member to simultaneously operate, upon its advancing movement. While upon the returning movement of the actuating member, only the diaphragm drive member is driven, with the reflecting mirror drive member being allowed to follow the movement of the actuating member merely due to the normal tendency of the movable reflecting mirror. Accordingly, the returning force of the spring member in the diaphragm drive mechanism will not be exerted on the reflecting mirror drive member. On the other hand, there may be placed a power-increasing or booster mechanism between the actuating member and the diaphragm drive member. Thus, the output of the diaphragm drive member can be increased for opening the diaphragm, as compared with stopping down of the diaphragm. In addition, there can be provided a mechanism in which when the diaphragm is stopped down from its open position to its pre-adjusted diaphragm aperture before commencement of the releasing operation of the shutter, the excessive force of an automatic stopping-down mechanism, which is operated due to the advancing movement of the actuating member is association with the releasing operation, is prevented.

DESCRIPTION OF THE PREFERRED EMBODIMENTS

Figure 1:
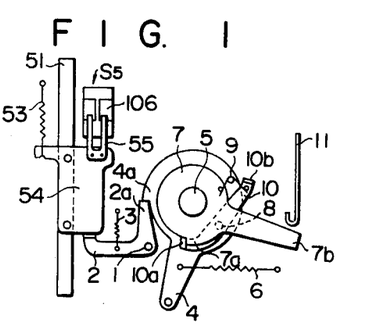
FIG. 1 is a side view of a shutter release member and an associated drive member in accordance with the present invention.

As shown in FIG. 1, a drive member 4, which is journaled on a shaft 5 to be mounted on a shutter block, is urged by a strong drive spring 6 so as to rotate in a counterclockwise direction. A locking member 2 having a pawl 2a engageable with a hook portion 4a of drive member 4 is journaled on a shaft 1 and is urged by a spring 3 so as to rotate in a clockwise direction. Pawl 2a will engage hook portion 4a, when drive member 4 is rotated in the clockwise direction against the action of drive spring 6 due to the winding operation so as to be cocked, thereby locking drive member 4 in its cocked position. When a shutter release button 51 is depressed due to a releasing operation thus causing integrally formed releasing plate 54 to be lowered against the action of a return spring 53, then a contact piece 55 opens subsidiary storing switch S5 in an electronic shutter circuit, to be described later. Releasing plate 54 then engages locking member 2 so as to rotate it same in the counterclockwise direction against the action of spring 3, thus releasing hook portion 4a from engagement with pawl 2a. As a result, drive member 4 will rotate from its cocked position to its rest position.

A drive-force transmitting member 7 is rotatably supported on shaft 5 in concentric relationship with drive member 4. A connecting lever 10 is rotatably supported on drive member 4 by shaft 8 and has a tendency to be rotated in the clockwise direction by means of a spring 9. Connecting lever 10 is formed with bent pieces 10a, 10b on its opposite sides. Bent piece 10a tends to engage a hook portion 7a of drive-force transmitting member 7 under the action of spring 9. Bent piece 10b, on the other hand, is engageable with a member interlocking with a shutter rear curtain in association with completion of an exposure operation, which is effected by the rear curtain of the shutter, in a condition where drive member 4 has been rotated in the counterclockwise direction by means of drive spring 6. Thus, engagement of both members will cause connecting lever 10 to rotate in the counterclockwise direction against the action of spring 9, so that bent piece 10a is disengaged from hook portion 7a. Arm 7b of drive-force transmitting member 7, when rotated in the counterclockwise direction, will engage actuating member 11 so as to provide a line contact, as will be described below.

Figure 2:
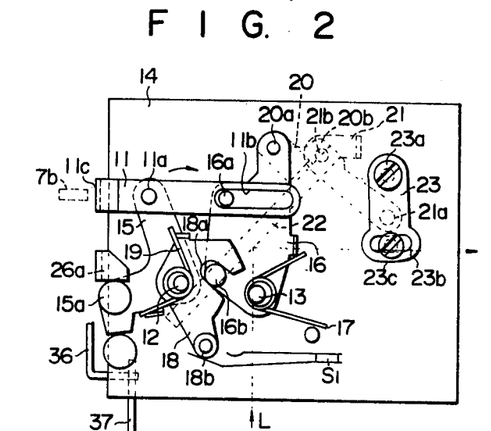
FIG. 2 is a side view of the portion of the camera housing the mirror showing the associated drive mechanisms in accordance with the present invention.

Referring to FIG. 2, an intermediate lever 15 is rotatably supported on a side wall 14 of a mirror box by a shaft 12 and is imparted with a tendency by a spring 19 to be rotated in the counterclockwise direction. Anchored on one end of intermediate lever 15 is a pin 15a. A sliding pin 16a and an engaging pin 16b are anchored on a mirror drive lever 16 which is rotatably supported on a shaft 13 rather than shaft 12 and is imparted with a tendency by a spring 17 to be rotated in the counterclockwise direction.

Actuating member 11 is connected to intermediate lever 15 through a shaft 11a. Actuating member 11 also has a slot 11b, in which sliding pin 16a of mirror drive lever 16 is slideably fitted. A bent surface 11c formed on actuating member 11 at its one end presents a line contact with arm 7a of drive-force transmitting member 7. In other words, arm 7a contacts bent surface 11c in a line contacting relation rather than a point contacting relation in such a manner that when drive-force transmitting member 7 is rotated so as to push actuating member 11, actuating member 11, being guided by pin 11a connecting with intermediate lever 15, sliding pin 16a and slot 11b, will move in parallel to itself so as not to change the contacting angle between arm 7a and bent surface 11c.

A cam lever 18 is journaled on shaft 12 and formed with a convex cut portion 18a, engaged with engaging pin 16b, and an insulating pin 18b. Cam lever 18 is imparted with a tendency to be rotated in the clockwise direction by means of spring 19, which is spanned between lever 18 and intermediate lever 15. In addition, insulating pin 18b, immediately before the releasing operation as shown in FIG. 2, maintains an electromagnet switch S1 in an open position against its normal tendency to be closed. When actuating member 11 moves in the advancing direction from the position shown in FIG. 2 by being pushed by an arm 7b, mirror drive lever 16 is then rotated in the clockwise direction, whereupon cam lever 18 is rapidly rotated in the counterclockwise direction through the engagement between convex cut portion 18a and engaging pin 16b so as to thereby close electromagnet switch S1.

A mirror holding member 20 is rotatably supported by a shaft 20a on mirror drive lever 16. Mirror holding member 20 holds a movable mirror 22 and is formed with a hole 20b. Movable mirror 22 intersects optical axis L at an angle of 45°.

On the other hand, a control or limiting lever 23 is rotatably supported by a shaft 23a on side wall 14 of the mirror box. The rotational angle of control lever 23 is limited since the control lever has an arcuate slot 23b fitted on a pin 23c anchored on side wall 14 of the mirror box, with arcuate slot 23c having its center at shaft 23a. A mirror adjusting plate 21 has a pin 21b which is rotatably fitted in hole 20b in mirror holding member 20. One end of mirror adjusting plate 21 is pivoted to control lever 23 by means of a pin 21a. Accordingly, when mirror drive lever 16 is rotated from the condition shown in FIG. 2 in the clockwise direction, then mirror holding member 20 will be rotated by shaft 20a and shaft 21b, following the movement of shaft 20a, thereby rotating movable mirror 22 so that it is retracted from optical axis L.

Figure 3:
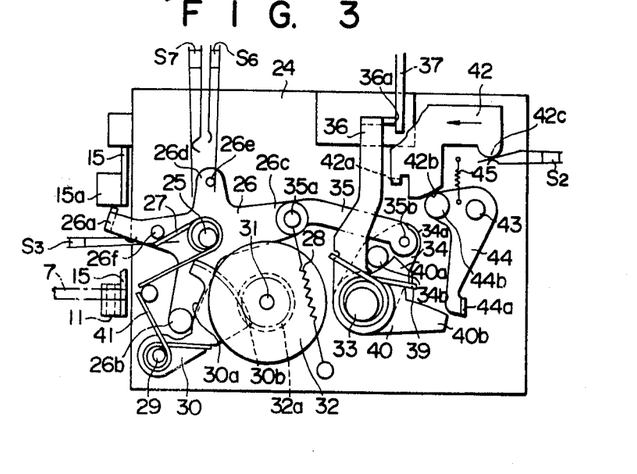
FIG. 3 is a bottom view of the portion of the camera shown in FIG. 2.

An intermediate lever 26 having four arms is provided, as shown in FIG. 3. Intermediate lever 26 is rotatably supported by a shaft 25 on a bottom wall 24 of the mirror box and is urged by a spring 27 so as to rotate in the clockwise direction such that a bent piece 26a formed on its first arm will abut pin 15a. Anchored on a second arm lever 26 is a pin 26b. A connecting rod, to be later described, is connected by a shaft 35a to a third arm 26c. A switch pin 26e is formed on a fourth arm 26d and operates so as to open and close a trigger subsidiary switch S6 in an electronic control circuit as well as a discharging switch S7, which will be later described. A switch pin 26f mounted on the first arm operates so as to open and close a storing switch S3. Attached to shaft 35a is a spring 28 which urges diaphragm intermediate lever 26 so as to rotate in the clockwise direction.

A cam sector gear lever 30 is rotatably supported on a shaft 29 and urged by a spring 41 so as to rotate in the counterclockwise direction. Formed on the arm of cam sector gear lever 30 is a cam surface 30a, on which pin 26b abuts, while its sector gear 30b meshes with a gear 32a. Gear 32a is coaxial with a fly wheel 32 which is rotatably supported by a shaft 31 on bottom wall 24 of the mirror box.

Three levers are rotatably supported by a shaft 33 on bottom wall 24 of the mirror box in such a manner that a first lever 34 is connected at its end 34a to one end of connecting rod 35 by means of shaft 35b. An operating pin 34b is anchored on the first lever 34. A second lever 40 is journaled on a shaft 33 and has an engaging arm 40a which may abut operating pin 34b on its counterclockwise side. Second lever 40 has locking arm 40b which is of a 'V' shape. The third lever, a diaphragm drive lever 36, is adapted to contact operating pin 34b on its clockwise rotating side. Diaphragm drive lever 36 is also journaled on shaft 33. A spring 39 is spanned between engaging arm 40a of second lever 40 and diaphragm drive lever 36, thereby imparting a tendency to hold operating pin 34b between engaging arm 40a and diaphragm drive lever 36.

Within the above-described arrangement, there is provided an obtuse angle formed by a line which connects shaft 25 to shaft 35a and a line which connects shaft 35a to shaft 35b, as shown in FIG. 3. There is also provided an angle, close to a right angle, formed by a line which connects shaft 35a to shaft 35b and a line which connects shaft 35b to shaft 33. This arrangement provides a power increasing or booster mechanism, in which a torque exerted on diaphragm intermediate lever 26 in the counterclockwise direction is increased and then transmitted to first lever 34.

Figure 4:
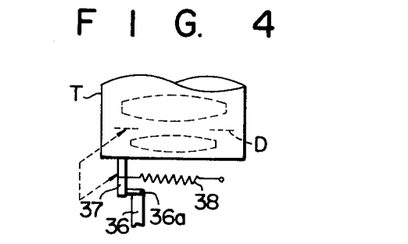
FIG. 4 is a side view showing the relationship between the diaphragm in an exchangeable objective lens and a diaphragm drive mechanism mounted on a camera body.

As can be seen from FIGS. 3 and 4, bent portion 36a of diaphragm drive lever 36 engages diaphragm operating pin 37 which tends to stop down a diaphragm D for an exchangeable lens T by means of a spring 38.

As shown in FIG. 3, a manual diaphragm-operating plate 42 may be manually moved in the direction of the arrow, by a force from outside the body of the camera. Formed on manual diaphragm-operating plate 42 are a bent operating-piece 42a which engages and pushes diaphragm drive lever 36, a control cam surface 42b which controls a stop lever 44 to be described later and a switch actuating projection 42c which opens and closes a stopping-down light measuring switch S2 to be described later.

Stop lever 44 is rotatably supported by a shaft 43 on bottom wall 24 of the mirror box and is urged by a spring 45 so as to rotate in the clockwise direction. A pin 44b anchored on the end of one arm of stop lever 44 engages control cam surface 42b of manual diaphragm-operating plate 42, while a locking piece 44a formed on the other arm of lever 44 is engageable with locking arm 40b of second lever 40.

Figure 5:
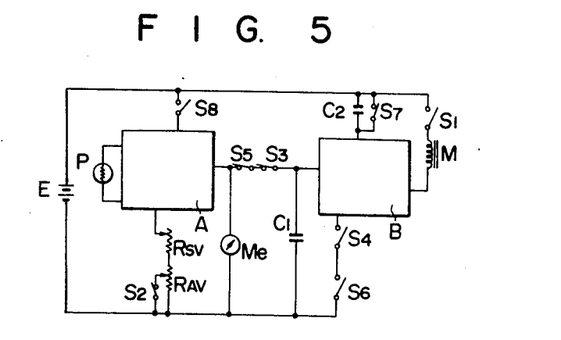
FIG. 5 is a schematic diagram of an electronic control circuit for use in the above embodiment of the present invention.

FIG. 5 shows one embodiment of an electronic control circuit according to the present invention. As shown, a light measuring circuit A having a light measuring element P is connected to an electric power source E by way of an electric power source switch S8. The output of circuit A is measured at a meter Me and charges a first storing capacitor C1 by way of a storing switch S3 and subsidiary storing switch S5, both of which are connected in series to each other. Two variable resistors RSV and RAV connected in series to each other bias the output of light measuring circuit A. The resistance value of variable resistor RSV depends on the film sensitivity setting member in the camera, while the resistance value of variable resistor RAV depends on the setting of a diaphragm pre-setting ring. In addition, stopping down light measuring switch S2, which short-circuits resistor RAV, uses the variable resistor RAV as a constant resistor in the case of a stopping-down light-measuring mode.

The stored voltage in storing capacitor C1 is impressed on switching circuit B which has associated therewith a switch S7 adapted to discharge a second storing capacitor C2, a trigger switch S4 and a subsidiary trigger switch S6 connected in series. An electromagnet M is connected to the output of switching circuit B and is also connected to electric power source E by way of electromagnet switch S1.

In operation, when release button 51, as shown in FIG. 1, is depressed a contact piece 55 opens subsidiary storing switch S5. The output of light measuring circuit A is then stored in storing capacitor C1. Subsequently, drive member 4 maintained in its cocked position by means of locking member 2 is disengaged from this locked condition. Drive member 4 is rotated by the drive force of spring 6 to its rest position in the counterclockwise direction, and drive force transmitting member 7, which is engaged with drive member 4 via connecting rod 10, is also rotated in the same direction. Arm 7b abuts actuating member 11 and thereby drives actuating member 11 to the right as shown in FIG. 2, so that intermediate lever 15 and mirror drive lever 16 are rotated in the clockwise direction and cam lever 18 is rotated in the counterclockwise direction to close electromagnet switch S1. Movable mirror 22 is then rotated from its viewing position, intersecting with optical axis L of a picture taking lens, to its picture taking position.

The clockwise rotation of intermediate lever 15 increases the force applied by spring 19 to cam lever 18 and causes diaphragm intermediate lever 26 as shown in FIG. 3 to rotate in the counterclockwise direction by means of pin 15a anchored on intermediate lever 15. The counterclockwise rotation of diaphragm intermediate lever 26 is effected against the urging forces of springs 27, 28. Pin 26b on diaphragm intermediate lever 26 pushes against cam surface 30a of cam sector gear lever 30 to thereby rotate lever 30 against the action of spring 41 in the clockwise direction, thus rotating delay flywheel 32 in the counterclockwise direction. During such movement, switch pins 26e, 26f close subsidiary trigger switch S6, open discharge switch S7, and open storing switch S3, respectively.

Thus, the torque of diaphragm intermediate lever 26 is increased and rotates first lever 34 in the counterclockwise direction. Operation pin 34b, which is confined between diaphragm drive lever 36 and second lever 40, in turn rotates diaphragm drive lever 36 in the counterclockwise direction, thus stopping down diaphragm D from its open position to its pre-adjusted diaphragm aperture.

After movable mirror 22 has been retracted out of the photographing optical path and the diaphragm has been stopped down, the counterclockwise rotation of drive member 4 releases a shutter front curtain (not shown) from the locked condition so as to cause it to start travelling. Then, trigger switch S4, which is normally opened, is closed. When trigger switch S4 is closed, the charged voltage in storing capacitor C1 controls the time until the time constant condensor C2 is charged to a preset level. Thus, when condensor C2 is charged to a given voltage, then the operation of switching circuit B demagnetizes electromagnet M from its excited condition, and releases the shutter rear curtain from its locked condition, so that the rear curtain may travel to complete the exposure operation. At the same time, bent piece 10b of connecting lever 10 receives a travel-completion signal from the rear curtain, and connecting lever 10 is rotated in the counterclockwise direction against the action of spring 9, thereby disengaging hook portion 7a from bent piece 10a. As a result, drive force transmitting member 7 causes actuating member 11 to return due to the urging forces of spring members 27, 28 and 41, which forces have been imparted at the time of the advancing movement of actuating member 11. In other words, diaphragm intermediate lever 26 is rotated in the clockwise direction by means of spring members 27, 28 and 41, and then the above rotating forces are transmitted to diaphragm drive lever 36 by way of connecting rod 35 and first lever 34 in a power-increased manner. This movement of diaphragm drive lever 36 causes diaphragm operating pin 37 to move to the left as shown in FIG. 4 against the action of the spring 38 having a strong urging force, thereby causing diaphragm D to return to its open position.

The clockwise rotation of diaphragm lever 26 by means of spring members 27, 28 and 41 causes bent piece 26a to push pin 15a. Meanwhile intermediate lever 15 is rotated in the counterclockwise direction due to an urging force of spring 19 and the force acting on pin 15a. Actuating member 11, to which intermediate lever 16 is pivoted at its one end, is returned leftwards in FIG. 2, thereby returning drive-force transmitting member 7 by rotating it in the clockwise direction. At this time, since the movable mirror system is connected to pin 16a by means of slot 11b, according to a pin-slot connection, the returning force of the diaphragm system will not be applied to the movable mirror system. The urging force of spring 17 causes mirror drive lever 16 to rotate in the counterclockwise direction, following the advancing movement of actuating member 11, thereby causing movable mirror 22 to move to its viewing position in the picture taking optical path.

Immediately before the completion of the returning movement of movable mirror 22, pin 18b of cam lever 18, which is adapted to rotate under the control of pin 16b on mirror drive lever 16, will push the contact piece of magnet switch S1 so as to thereby open the switch. In this manner, the contact piece of switch S1 absorbs or dampens the returning force of the movable mirror, thereby permitting movable mirror 22 to return to its predetermined position without causing an impact sound.

The film winding and shutter cocking operations cause drive member 4 to rotate in the clockwise direction against the action of drive spring 6 so as to be cocked. Drive member 4 is maintained in this position due to the engagement of pawl 2a of locking member 2 with hook portion 4a. Bent piece 10a of connecting lever 10 is then in engagement with hook portion 7a of drive-force transmitting member 7.

In this manner, according to the present invention, there are provided a power-increasing or booster mechanism and an excessive energy absorbing or dampening member which aid in maintaining the drive forces of the respective members and loads acting thereon in a balanced condition.

Figure 7:
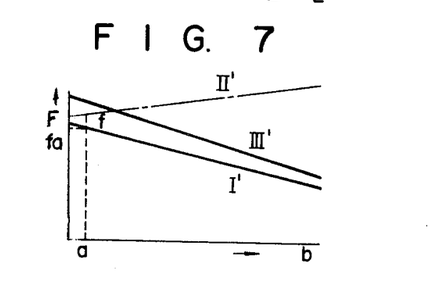
FIG. 7 is a plot illustrating the relationship between the drive force of a diaphragm drive lever in terms of its stroke and a load acting thereon both with respect to the present invention and previously known systems.

Reference is now made to FIG. 7. The tendency of the diaphragm for an exchangeable lens T, as shown in FIG. 4, to be stopped down is imparted by spring 38. The force of spring 38 is such that it peaks in position $a$ in the open condition of the diaphragm and then gradually decreases as the diaphragm is being stopped down, as shown by a line I' in FIG. 7. In this case, with the conventional type of camera, the force of diaphragm drive lever 36 to return diaphragm D to its open position against the above force is set to the standard value $fa + f$ which is somewhat higher than the maximum value $fa$, as shown by a line II'. Thus, on the side of the stopped down position $b$ which gives a load lower than this standard value, a force greater than the standard value acts on the diaphragm. The difference in a force which is greater than the difference $f$ between a load and a driving force experienced at the standard value is not only required but also results in a heavier stopping-down operation. In addition, the excessive energy at the time of opening the diaphragm causes the sound and impact force, which are detrimental to the camera.

For improving these shortcomings, the present invention provides a power-increasing or booster mechanism consisting of diaphragm intermediate lever 26, connecting rod 35, first lever 34 and a diaphragm drive lever 36, in addition to an excessive energy absorbing member represented by cam sector gear lever 30 and its spring 41. By utilizing the returning force of these members, the difference between load and driving force is maintained so as to give a drive force represented by a line III' which is substantially parallel to line I', as shown in FIG. 7.

Figure 6:
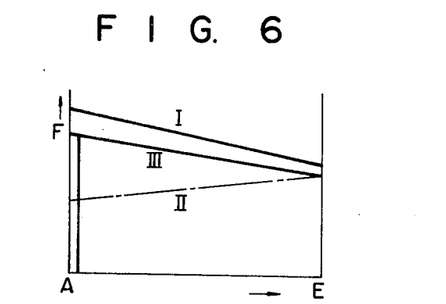
FIG. 6 is a plot illustrating the relationship between the drive force of a drive-force transmitting member in terms of its stroke and a load acting thereon both with respect to the present invention and previously known systems.

Referring to FIG. 6, the relationship between a load and a drive force acting on the drive-force transmitting member 7 will now be described with taking the above-noted factors into consideration. The load in the absence of cam lever 18, shown in FIG. 2 and cam sector gear lever 30, shown in FIG. 3, is increased with the rotational stroke of drive-force transmitting member 7, as shown by a line II in FIG. 6. However, if the drive force of diaphragm drive lever 36 is such as shown by line II' in FIG. 7, the load shown by line II will be further increased. In contrast, the drive force of drive-force transmitting member 7 is gradually decreased with the above-mentioned rotational stroke. Consequently, if the set standard value is taken at terminal E of the stroke which effects the shutter releasing operation, then there results an unwanted difference in force at point A representing the starting movement of drive-force transmitting member 7. By providing cam lever 18, cam sector gear lever 30 and springs 19 and 41 acting thereon, which absorb the force upon advancing travel and utilize the same force as an output on returning travel, the total load may be gradually decreased, thereby presenting a line III which gives a smaller difference between a load and a drive force.

The above description relates to a photographing operation, associated with an automatic stopping-down operation, i.e., the releasing operation of the shutter, in which the diaphragm which has been in its open position is stopped down to a preadjusted diaphragm aperture, and the movable reflecting mirror is shifted from its viewing position to its picture taking position, after which exposure is effected. Subsequently, in this operation, in association with completion of the exposure, the movable reflecting mirror is returned from its picture taking position to its viewing position, while the diaphragm is returned from its stopped-down position to its open position.

A description now will be provided for the case where the diaphragm is manually stopped down to a pre-adjusted diaphragm aperture in its viewing condition and then the focal depth of an objective lens is observed, followed by an exposure operation. In such a case, manual diaphragm operating plate 42 is manually manipulated from outside the camera beforehand so as to push operating plate 42 in the direction of the arrow, as shown in FIG. 3.

In accordance with this manipulation, bent operating piece 42a of manual diaphragm operating plate 42 engages diaphragm drive lever 36 to thereby rotate lever 36 in the counterclockwise direction. Diaphragm operating pin 37 is then moved to the right as viewed in FIG. 4 and to the left as viewed in FIG. 3, thereby stopping down diaphragm D to a pre-adjusted diaphragm aperture.

The operation of a previously known system will be described with reference being made to FIG. 3. The counterclockwise rotation of diaphragm drive lever 36 loads spring 39, i.e., causes spring 39 to store energy for second lever 40 which is stopped by engaging first lever 34, which stops at an angular position about shaft 33, and its operating pin 3. Then, the force of spring 39 thus stored increases the drive force of first lever 34, when diaphragm intermediate lever 26 is rotated in the counterclockwise direction due to the releasing operation of the shutter, so that first lever 34 is rotated in the counterclockwise direction. This means that the counterclockwise drive force of first lever 34 at the time of manual photographing is increased, as compared with the counterclockwise drive force of first lever 34 at the time of automatic stopping down photographing, so that an excessive drive force thus increased presents the causes for developing sound as well as unwanted impact on the parts of a camera.

In contrast to such an operation, according to the present invention, manual diaphragm operating plate 42 slides to the left as shown by the arrow, so that pin 44b on stop lever 44 is released from being pushed by control cam surface 42b, whereupon stop lever 44 is rotated by spring 45 in the clockwise direction from its first position to its second position as shown in FIG. 3. As a result, locking piece 44a engages locking arm 40b of second lever 40 to thereby lock the second lever in the position shown in FIG. 3 or in a position which has been shifted to some extent in the clockwise direction. This forcibly causes spring 39 to be extended against its normal tendency to thereby release operating pin 34b on first lever 34 from engagement with diaphragm drive lever 36 and engaging arm 40a of second lever 40. In other words, the engagement of first lever 34, second lever 40 and diaphragm drive lever 36 by the medium of spring 39 is released so that first lever 34 may be released from the drive force of spring 39 to effect the counterclockwise rotation of first lever 34. As a result, the drive force of diaphragm intermediate lever 26 may be maintained substantially equal to the drive force resulting at the time of an automatic stopping down photographing operation.

Meanwhile, when manual diaphragm operating plate 42 is caused to slide to the left, the diaphragm is stopped down manually, so that the information of the diaphragm has been fed to light measuring element P which measures the brightness of an object through an objective lens. It is imperative that, in the light measuring circuit of FIG. 5, the variable resistor RAV for feeding the diaphragm information to light measuring circuit A be provided as a constant resistor by opening the stopping down light measuring switch S2. For this reason, switch actuating projection 42c of manual diaphragm operating plate 42 releases stopping-down light measuring switch S2 thereby allowing it to open.

It is noted that the above description and the accompanying drawings are provided merely to present exemplary embodiments of the present invention and that additional modifications of such embodiments are possible within the scope of this invention without deviating from the spirit thereof.

What is claimed is:

1. A single lens reflex camera comprising:
   a first drive member movable between a cocked position and a rest position;
   a drive-force transmitting member engaging said drive member and being rotatable therewith when said first drive member moves from its cocked position to its rest position;
   an actuating member reciprocally movable from a first position to a second position and being engaged by said drive-force transmitting member for effecting such movement of said actuating member;
   spring means for causing said actuating member to return from its second position to its first position;
   a diaphragm normally biased for movement from an open aperture position to a stopped down position;
   a diaphragm drive member operatively coupled with said actuating member and rotatable in association with the movement of said actuating member and, upon movement of said actuating member from its first to its second position, said diaphragm drive member serving to enable said diaphragm, normally biased in a direction for being stopped down, to be stopped down from its open aperture position to a preadjusted diaphragm aperture, and upon return movement of said actuating member, said spring means causing said diaphragm drive member to drive the diaphragm against its normal biasing from its stopped down position to its open position;
   a reflecting mirror movable between a viewing position and a picture taking position and biased so as to be normally located in its viewing position;
   a reflecting mirror drive member coupled to said reflecting mirror and adapted to be operatively coupled to said actuating member such that upon advancing movement of said actuating member, said mirror drive member drives said reflecting mirror from its viewing position to its picture taking position, and upon return movement of said actuating member, said mirror drive member being disengaged from said actuating member; and
   means for disengaging said first drive member from said drive-force transmitting member.

2. A camera as defined in claim 1, wherein said drive-force transmitting member is maintained in a line-contacting relationship with said actuating member.

3. A camera as defined in claim 1, further comprising:
   a coupling mechanism for operatively coupling a drive force from said actuating member to said diaphragm drive member, said coupling mechanism operating such that when said actuating member is in its first position, said coupling mechanism increases said drive force coupled to said diaphragm drive member and when said actuating member is in its second position, said coupling mechanism decreases said drive force coupled to said diaphragm drive member.

4. A camera as defined in claim 1, further comprising:
   a camera body; a first shaft connected to said camera body and rotatably supporting said mirror drive member; a further spring member operatively coupled with said mirror drive member and being cocked upon movement of said actuating member from its first to its second position; an intermediate lever rotatably supported on said camera body by a second shaft and being coupled with said actuating member, said intermediate lever being coupled to said diaphragm drive member; and a cam lever operatively engaged with said mirror drive member, and in the initial stage of its movement, said cam lever actuating an exposure termination switch.

5. A camera as defined in claim 1, further comprising:
   a camera body; a first shaft connected to said camera body and rotatably supporting said mirror drive member; a second spring member operatively coupled with said mirror drive member and being cocked upon movement of said actuating member from its first to its second position; an intermediate lever rotatably supported on said camera body by a second shaft and being coupled with said actuating member, said intermediate lever being coupled to said diaphragm drive member; and a cam lever rotatably supported on said second shaft and having a spring spanned between said intermediate lever and said cam lever and having a cam surface engaged with said mirror drive member.

6. A camera as defined in claim 5, further comprising:
   a diaphragm intermediate lever engageable with said intermediate lever and adapted to be driven upon movement of said actuating member from its first to its second position, said diaphragm intermediate lever having positioned thereon said spring member which causes movement of said actuating member when said drive member is disengaged from said drive-force transmitting member and said diaphragm intermediate lever being journaled on said camera body via a third shaft;

a first lever rotatably supported on a fourth shaft and having a pin anchored thereon;

said diaphragm drive member being journaled on said fourth shaft;

a connecting rod connecting said diaphragm intermediate lever to said first lever; and a second lever rotatably supported on said fourth shaft and biased by a third spring member such that said pin is held between said second lever and said diaphragm drive member.

7. A camera as defined in claim 6, further comprising a sector gear lever having a cam surface, said cam surface being urged by a fourth spring into engagement with said diaphragm intermediate lever and a fly wheel governor in meshing engagement with said sector gear lever.

8. A camera as defined in claim 7, further comprising an electronic shutter control mechanism including:

a light measuring circuit having a light receiving element adapted to receive light from an object, which light has been transmitted through an objective lens, and a variable resistor for biasing said light measuring circuit and having a slide member adapted to shortcircuit a portion of the resistance of said variable resistor, said portion being commensurate with a pre-adjusted diaphragm aperture of said diaphragm;

first signal storing means connected to an output of said light measuring circuit;

second signal storing means being operatively coupled to said first signal storing means and providing a timing signal at its output, said timing signal being commensurate with a voltage stored in said first storing means;

a switching circuit coupled to said output of said second storing means and providing in response to said timing signal a triggered output signal;

an electromagnet operatively controlled by said triggered output signal from said switching circuit and adapted to control termination of an exposure operation; and, first switch means for selectively connecting and disconnecting said electromagnet to and from an electric power source, said first switch means being in operative engagement with said cam lever so as to be opened by said cam lever when said reflecting mirror is in its viewing position and closed by said cam lever upon movement of said reflecting mirror from its viewing position to its picture taking position.

9. A camera as defined in claim 8, further comprising:

a diaphragm operating member manually movable between a first position wherein the diaphragm is opened prior to a shutter releasing operation and a second position wherein the diaphragm is stopped down to a pre-adjusted diaphragm aperture;

a stop member for stopping said second lever in a position to open the diaphragm and releasing such stopping condition, when said diaphragm operating member is in its first position; and second switch means connected to said slide member of said variable resistor, said second switch means being closed when said diaphragm operating member is in its first position and being opened when said diaphragm operating member is in its second position.

10. A single lens reflex camera comprising:

a diaphragm normally biased in a direction for being stopped down from an open aperture position to a pre-adjusted diaphragm aperture;

a reflecting mirror movable between a viewing position and a picture taking position;

means for biasing said reflecting mirror to its viewing position;

a spring mechanism operatively coupled with said diaphragm for biasing said diaphragm in an open position;

a drive mechanism adapted to be actuated for enabling said diaphragm to be stopped down from its open position to its pre-adjusted diaphragm aperture against the force of said spring mechanism, said drive mechanism being coupled with said spring mechanism so as to charge said spring mechanism upon actuation of said drive mechanism;

means for interconnecting said reflecting mirror with said drive mechanism only upon the actuation of said drive mechanism so that said drive mechanism moves said reflecting mirror to its picture taking position against the force of said reflecting mirror biasing means; and, means for rendering said drive mechanism ineffective after actuation of said drive mechanism so that said diaphragm is returned to its open position under the force of said spring mechanism which has been charged upon actuation of said drive mechanism, said spring mechanism being isolated from said reflecting mirror when said drive mechanism is rendered ineffective so that said reflecting mirror is moved to its viewing position under the force of said reflecting mirror biasing means.

11. A camera as defined in claim 10, wherein said drive mechanism includes:

a drive member movable between a cocked position and a rest position;

means for urging said drive member from its cocked position to its rest position, the urging force of said urging means acting as counter force against the force of said spring mechanism and being greater than the latter; and operable means interlocked with said drive member and said diaphragm and operable in response to the movement of said drive member due to the urging of said urging means from its cocked position to its rest position for enabling said diaphragm to be stopped down from its open position to its pre-adjusted aperture, said operable means being disconnected from said drive member by said means for rendering said drive mechanism ineffective upon completion of an exposure, whereby, upon completion of an exposure, the urging force of said urging means is removed from said diaphragm and said diaphragm is returned to its open position under the force of said spring mechanism.

12. A camera as defined in claim 11, further comprising:

means for cocking said drive member into its cocked position; and means for releasing the cocking of said drive member.

13. A camera as defined in claim 11, wherein said operable means includes:

a drive force transmitting member releasably connected with said drive member through said means for rendering said drive mechanism ineffective so as to be movable in conjunction with said drive member; and an actuating member arranged in the path of movement of said drive force transmitting member so as to engage with the latter, said actuating member being movable in a first direction under the urging force of said urging means through the engagement with said drive force transmitting member for enabling said diaphragm to be stopped down.

14. A camera as defined in claim 13, wherein said spring mechanism is operatively connected with said actuating member so as to move the latter in a second direction opposite to the first direction when said means for rendering said drive mechanism ineffective disconnects said drive force transmitting member from said drive member.

15. A camera as defined in claim 14, further comprising:

a mirror drive member movable between a first position and a second position for moving said reflecting mirror between its picture taking position and its viewing position, respectively, said mirror drive member being biased to its first position by said reflecting mirror biasing means;

and wherein said interconnecting means is disposed between said mirror drive member and said actuating member so that said mirror drive member is isolated from said actuating member upon the movement of said actuating member in the second direction whereas said mirror drive member is interlocked with said actuating member to be moved in the first direction against the force of said mirror biasing means upon movement of said actuating member in the first direction.

16. A camera as defined in claim 15, wherein said interconnecting means includes a slot formed on said actuating member and extending in the direction of movement of said actuating member and a pin formed on said mirror drive member and fitting within said slot so as to be driven by the end wall of said slot only upon movement of said actuating member in the first direction.

17. A camera as defined in claim 10, wherein said spring mechanism includes a power increasing mechanism for increasing the force of said spring mechanism as said diaphragm is returned to its open position.

18. A camera as defined in claim 17, wherein said drive mechanism includes a power decreasing mechanism for decreasing the force applied to said diaphragm as said diaphragm is stopped down to its pre-adjusted aperture.

19. A camera as defined in claim 18, wherein said power decreasing mechanism includes:

a first fixed shaft;

a second fixed shaft;

a first lever rotatably supported on said first shaft and having an arm coupled with said diaphragm;

a second lever rotatably supported in a coaxial relationship with said first lever;

means for connecting said second lever with said first lever;

a third lever rotatably supported on said second shaft and driven to rotate in a first direction;

a third shaft secured on said third lever;

a fourth shaft secured on said second lever, such that a line interconnecting said second shaft with said third shaft crosses a line interconnecting said third shaft with said fourth shaft at an obtuse angle and a line interconnecting said third shaft with said fourth shaft crosses a line interconnecting said fourth shaft with said first shaft at a substantially right angle; and a connecting member having one end supported on said third shaft and its other end supported on said fourth shaft, whereby said first lever is rotated to stop down said diaphragm through said second lever and connecting member upon movement of said third lever in a first direction.

20. A camera as defined in claim 19, wherein said power decreasing mechanism further includes means for retarding the movement of said third lever in the first direction.

21. A camera as defined in claim 20, wherein said power increasing mechanism includes said connecting means, said connecting member, said first, second, third and fourth shafts and said first, second and third levers.

22. A camera as defined in claim 20, further comprising manually operable means for rotating said first lever to cause said diaphragm to be stopped down to a pre-adjusted diaphragm aperture irrespective of the rotation of said third lever in the first direction.

23. A camera as defined in claim 22, wherein said manual operable means includes a member movable for disconnecting said first lever from said second lever against the force of said connecting means.

* * * * *